Patented May 25, 1954

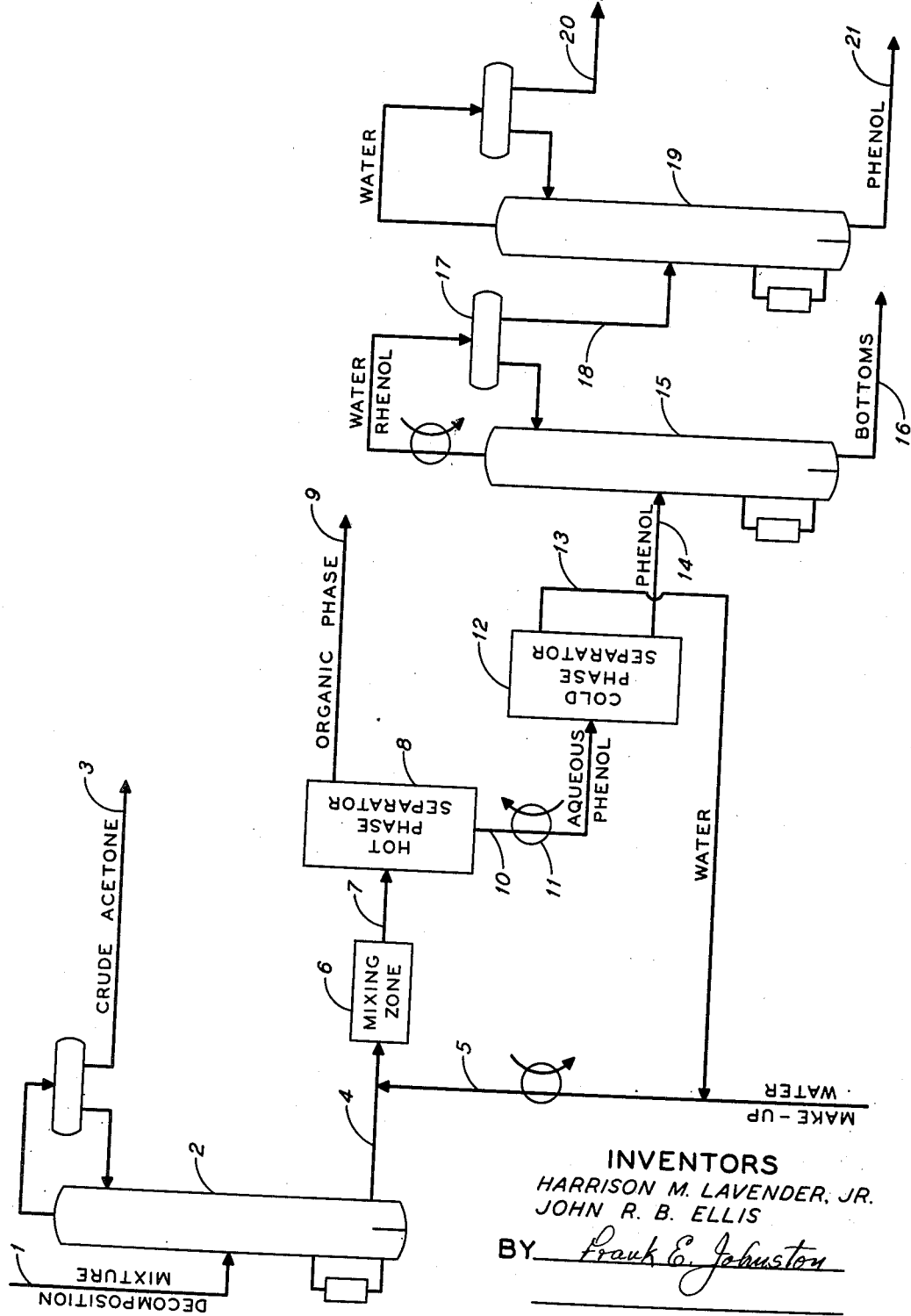

2,679,535

UNITED STATES PATENT OFFICE 2,679,535

PURIFICATION OF PHENOL

Harrison M. Lavender, Jr., San Anselmo, and John R. B. Ellis, San Rafael, Calif., assignors to California Research Corporation, San Francisco, Calif., a corporation of Delaware Application August 19, 1952, Serial No. 305,186

2 Claims. (Cl. 260—621)

This invention relates to a process for recovering phenol essentially free of hydrocarbons from cumene hydroperoxide decomposition mixtures.

A process has recently been developed for producing phenol from cumene. The fundamental chemistry involved in this process was described by Hock and Lang in Berichte, vol. 77, p. 257 (1944). Phenol is produced pursuant to this process by oxidizing cumene to produce a reaction mixture consisting predominantly of cumene and cumene hydroperoxide. Cumene hydroperoxide is then subjected to cleavage to produce phenol and acetone. The cleavage mixture is distilled to separate an overhead fraction consisting predominantly of acetone and a bottoms fraction consisting predominantly of phenol and containing smaller amounts of acetophenone, cumyl phenol and hydrocarbons is recovered. The bottom fraction from the acetone still is distilled to separate an overhead fraction consisting predominantly of phenol and containing 5 to 10% of hydrocarbons. This overhead fraction is then subjected to a further distillation where it is attempted to separate the hydrocarbons as the overhead fraction and withdraw a substantially hydrocarbon-free phenol as a bottoms fraction.

The great bulk of the phenol of commerce is required to pass the water dilution test described in U. S. Pharmacopoeia (XIVth revision, p. 458). This test requires that one part of phenol dissolve in fifteen parts of water to produce a clear solution. If the solution is turbid, the phenol does not meet specification. In practical effect this test requires that acceptable phenol have an extremely low content of hydrocarbons, i. e., below about 0.05% by weight. If the phenol contains minor quantities of other impurities such as acetophenone or dimethyl phenyl carbinol, the hydrocarbon tolerance is substantially reduced. In the production of phenol from cumene considerable difficulty is encountered in recovering phenol which will pass the water dilution test. Small quantities of alkyl aromatic hydrocarbons, such as butyl benzenes, are commonly present in any practical cumene feed. Paraffins and olefins also may be present. These materials in part pass through the process and appear as contaminants of the phenol product from which they cannot be separated by conventional distillation methods. In addition, side reactions occurring during the oxidation and cleavage steps cause formation of by-product alkyl and alkenyl aromatic hydrocarbons which cannot be readily separated from phenol by commercial distillation techniques. The separation of phenol from hydrocarbons boiling within the range from about 170° C. to 210° C., especially alkyl aromatic hydrocarbons boiling within this range, by commercial distillation techniques, is not only impractically difficult but often is entirely impossible, since the boiling points of these hydrocarbons lie close to the boiling point of phenol and, furthermore, since they form azeotropes with phenol which boil very close to the boiling point of pure phenol.

It is an object of this invention to recover substantially pure phenol from cumene hydroperoxide decomposition mixtures.

It has now been found that phenol essentially free of hydrocarbons can be recovered from a cumene hydroperoxide decomposition mixture by fractionally distilling the decomposition mixture to separate an acetone-rich overhead fraction and a phenol-rich bottoms fraction, mixing the bottoms fraction with 50% to 500% by weight of water based on the phenol content of the fraction at a temperature in the range from 60° C. to 150° C., settling the resultant aqueous mixture at a temperature above about 60° C. to separate an upper oily phase and a lower aqueous phenol phase, withdrawing the aqueous phenol phase and cooling it sufficiently to cause separation of two liquid phases, but not below about 2° C.

The phenol-rich bottoms fraction is mixed with water at elevated temperatures ranging from 60° C. to 150° C. in order to produce a two-phase system, an aqueous phenol phase, and a hydrocarbon phase. The mixing of the water with the phenol bottoms fraction and the subsequent settling of the mixture are preferably carried out at temperatures ranging from about 65° C. to 100° C. After the upper hydrocarbon phase has been separated, the aqueous phenol phase is cooled sufficiently to cause formation of a phenol phase and a water phase. The aqueous phenol phase should not be cooled below about 1° C. since solid phenol will be formed at lower temperatures. The mixture is preferably cooled to a temperature in the range from 5° C. to 45° C. The lower phenol phase is then withdrawn and purified by distillation. The upper water phase, which contains dissolved phenol, is used as the water added to further quantities of the phenol-rich bottoms fraction.

The operation of the process of the invention will be better understood by reference to the appended drawing which is a diagrammatic illustration of apparatus and process flow suitable for the practice of the invention.

Cumene hydroperoxide is decomposed usually with an acid catalyst, for example, sulfuric acid, to produce predominantly phenol and acetone. The decomposition mixture is neutralized with a basic material such as sodium hydroxide or sodium phenate and the neutral product is desalted by filtration or water washing to yield a neutral salt-free decomposition mixture. This mixture is introduced through line 1 into still 2 where it is fractionally distilled to separate an overhead fraction consisting predominantly of acetone which is withdrawn through line 3. The bottoms fraction from still 2, ordinarily at a temperature in the range from 120° C. to 138° C., is passed through line 4 into mixing zone 6. Water is introduced into line 4 through line 5 and passes into mixing zone 6. The quantity of water introduced is sufficient to bring the water content in the mixing zone to a value in the range from 50 to 500% by weight of the phenol there present. A representative composition of the non-aqueous portion of the bottoms fraction passing from still 2 through line 4 into mixing zone 6 would be 81% phenol, 3.8% hydrocarbons including alpha-methylstyrene and hydrocarbons boiling in the range from 170° C. to 210° C., 3.2% dimethylphenyl carbinol, 3.1% acetophenone, 5.8% cumyl phenol, and 3.1% of higher boiling materials. The bottoms fraction may contain varying relatively small amounts of water in addition to the organic materials. Mixing zone 6 may be any conventional mixer which brings the water into intimate contact with the phenol-rich bottoms fraction to produce aqueous phenol. The mixture of water and the bottoms fraction passes from mixing zone 6 through line 7 into hot phase separator 8. The temperature in separator 8 is maintained in the range from 60° C. to 150° C., and preferably in the range from 65° C. to 100° C. Where temperatures above 100° C. are employed in mixing zone 6 and separator 8, these vessels are operated under pressures sufficient to maintain the water in liquid phase. Usually the pressure required for this purpose will not exceed 50 pounds per square inch. In phase separator 8 an upper organic phase consisting primarily of hydrocarbons and a lower aqueous phenol phase are formed. The organic phase is withdrawn from separator 8 through line 9 and rejected from the system. This material may subsequently be treated for the recovery of traces of phenol, for example, by caustic washing, if desired. The lower aqueous phenol phase is withdrawn from separator 8 through line 10 and passes through heat exchanger 11 where it is cooled to a temperature usually in the range from 1° C. to 45° C., and preferably to a temperature in the range from 15° C. to 40° C. The cold water-phenol mixture is passed into cold phase separator 12 where an upper aqueous phase containing some dissolved phenol and a lower phenol phase containing some dissolved water separate. The upper aqueous phase is withdrawn from separator 12 through line 13 and passed into line 5 for return to mixing zone 6. Makeup water is introduced into line 5 as required. A lower phenol phase is withdrawn from separator 12 through line 14 and passed into distillation column 15 where it is fractionally distilled to separate an overhead fraction consisting essentially of water and phenol and a bottoms fraction containing acetophenone, cumyl phenol, and higher boiling materials. The bottoms fraction is withdrawn from the system through line 16. The overhead fraction from still 15 is condensed and passed into reflux drum 17. A portion of the condensate is returned to still 15 as reflux and the remainder is passed through line 18 into still 19 where it is fractionally distilled to separate water and phenol. Water is withdrawn from the system through line 20 and dry phenol is withdrawn from the bottom of still 19 through line 21. The product phenol withdrawn through line 21 is essentially free of hydrocarbons.

We claim:

1. A process for recovering phenol from cumene hydroperoxide decomposition mixtures which comprises fractionally distilling the decomposition mixture to separate an acetone-rich overhead fraction and a phenol-rich bottoms fraction, mixing the bottoms fraction with 50% to 500% by weight of water based on the phenol content of the fraction in a mixing zone, settling the resultant aqueous mixture at a temperature above 65° C. to separate an upper oily phase and a lower aqueous phenol phase, withdrawing the aqueous phenol phase and cooling it sufficiently to cause separation of two liquid phases but not below about 1° C. and withdrawing the lower phenol-rich phase.

2. A process for recovering phenol from cumene hydroperoxide decomposition mixtures which comprises fractionally distilling the decomposiiton mixture to separate an acetone-rich overhead fraction and a phenol-rich bottoms fraction, mixing the bottoms fraction with 50% to 500% by weight of water based on the phenol content of the fraction in a mixing zone, settling the resultant aqueous mixture at a temperature in the range from 65° C. to 150° C. to separate an upper oily phase and a lower aqueous phenol phase, withdrawing the aqueous phenol phase and cooling it to a temperature in the range from 5° C. to 45° C. to separate an upper water phase and a lower phenol phase, separating the phases and returning the upper water phase to the mixing zone with further quantities of said bottoms fraction and withdrawing the lower phenol-rich phase.

References Cited in the file of this patent

UNITED STATES PATENTS

| Number | Name | Date |
| --- | --- | --- |
| 2,597,497 | Joris | May 20, 1952 |

FOREIGN PATENTS

| Number | Country | Date |
| --- | --- | --- |
| 649,286 | Great Britain | Jan. 24, 1951 |